N. P. SELDEN.
Scroll Sawing-Machine.

No. 212,326.   Patented Feb. 18, 1879.

Witnesses:
James H. Lange

Inventor:
Nels Peter Selden
per Edson Bro's
Attorneys

4 Sheets—Sheet 2.
N. P. SELDEN.
Scroll Sawing-Machine.
No. 212,326. Patented Feb. 18, 1879.
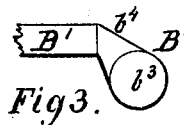
Fig 3.
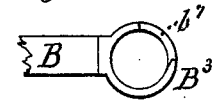
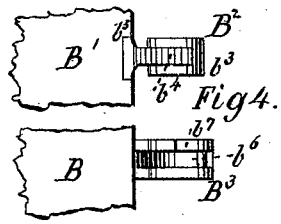
Fig 4.
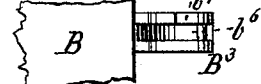
Fig 5.
Fig 6.
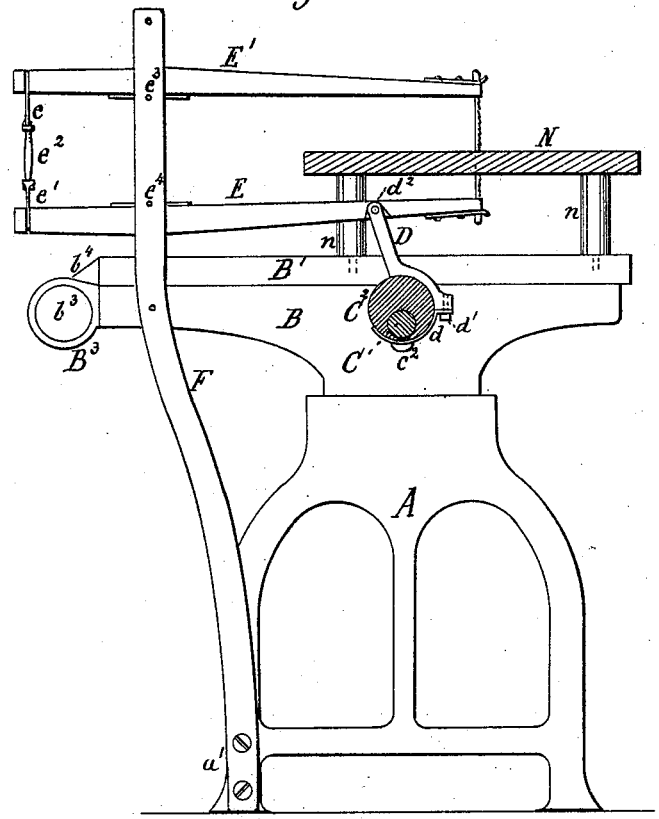
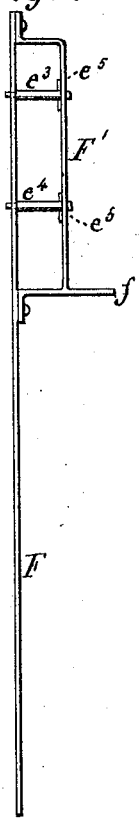
Fig 7.
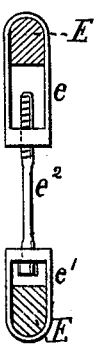
Witnesses:
James H. Lange.
J. A. Benthrong.
Inventor:
Nels Peter Selden
per Edson Bro's,
Attorneys.
N. PETERS, PHOTO-LITHOGRAPHER, WASHINGTON, D C.

N. P. SELDEN.
Scroll Sawing-Machine.

No. 212,326. Patented Feb. 18, 1879.

4 Sheets—Sheet 3.

Witnesses:
James H. Lange.
C. A. Benthrong.

Inventor:
Nels Peter Selden
per Edson Bros.
Attorneys

N. PETERS, PHOTO-LITHOGRAPHER, WASHINGTON, D. C.

N. P. SELDEN.
Scroll Sawing-Machine.
No. 212,326. Patented Feb. 18, 1879.
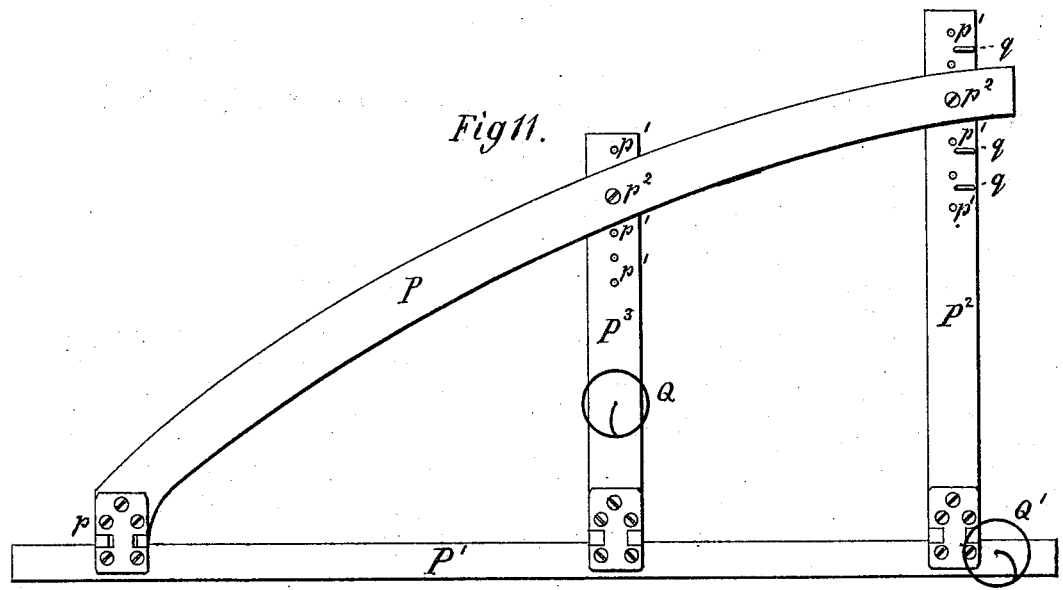
Fig 11.
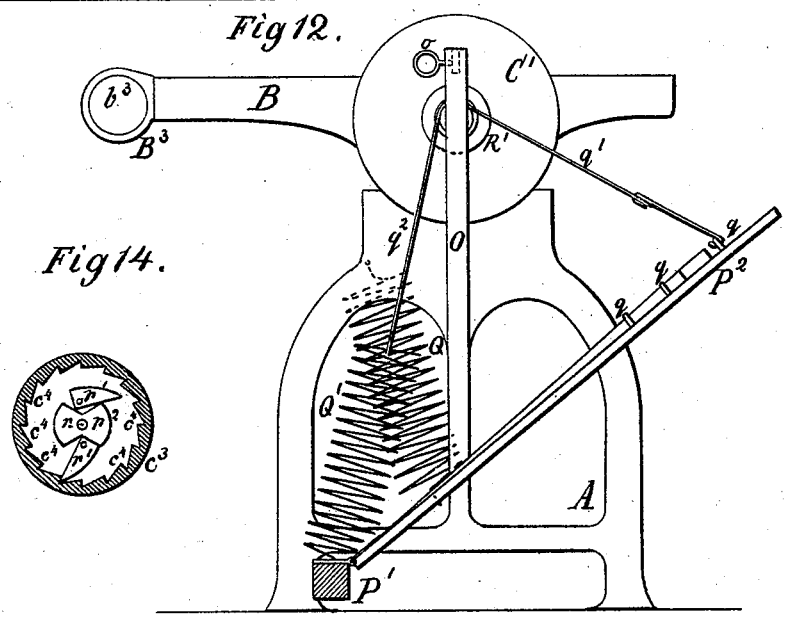
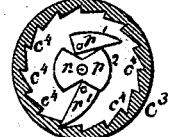
Fig 14.
Fig 13
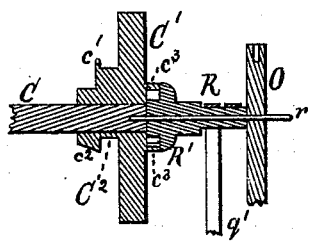
Witnesses:
James H. Lange.
J. P. Buthrong.
Inventor:
Nels Peter Selden
per Redson Bro's,
Attorneys

UNITED STATES PATENT OFFICE.

NELS PETER SELDEN, OF BELLE PLAINE, IOWA.

IMPROVEMENT IN SCROLL-SAWING MACHINES.

Specification forming part of Letters Patent No. 212,326, dated February 18, 1879; application filed March 7, 1878.

*To all whom it may concern:*

Be it known that I, NELS PETER SELDEN, of Belle Plaine, in the county of Benton and State of Iowa, have invented certain new and useful Improvements in Sawing-Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
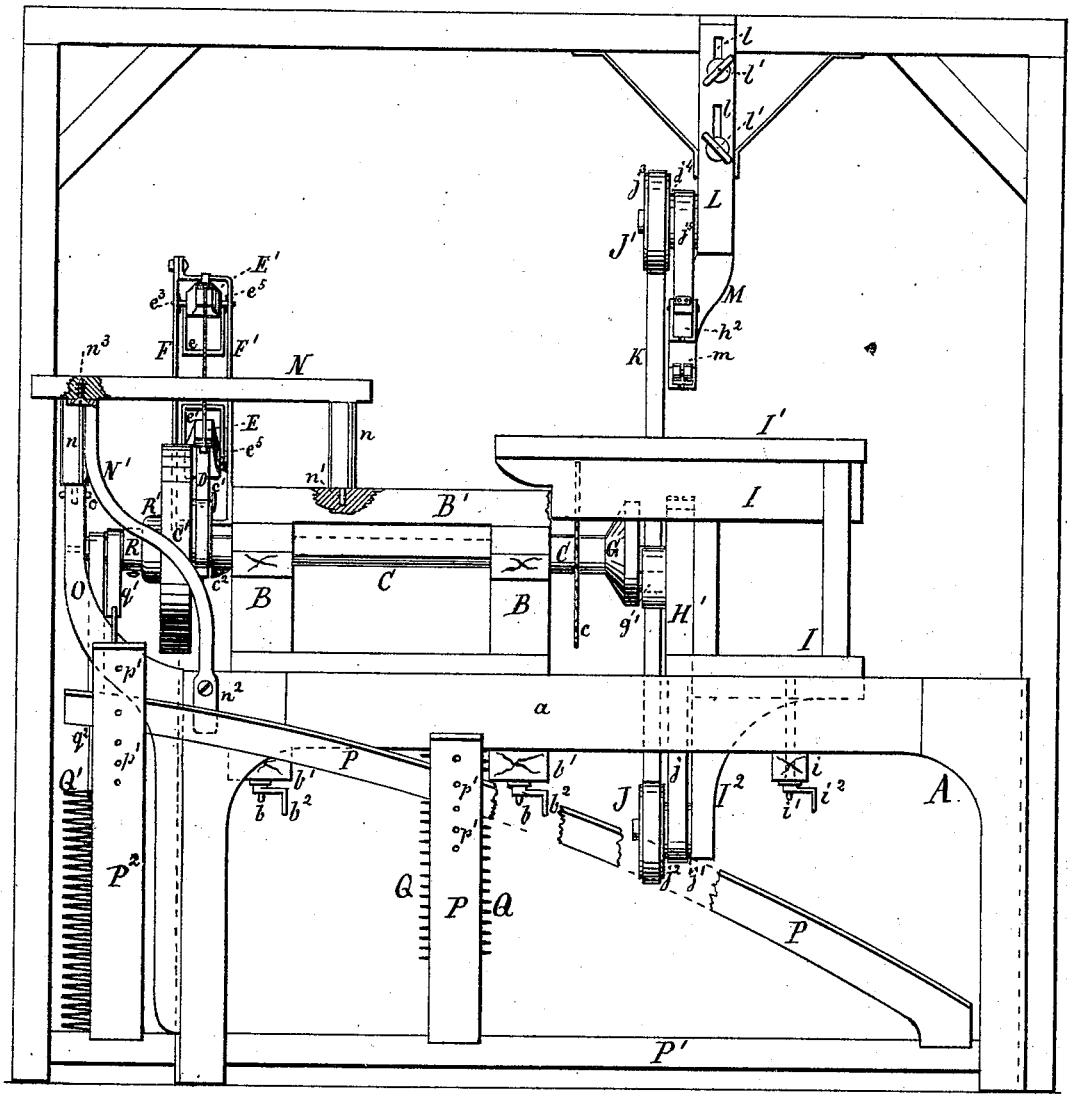
Figure 2:
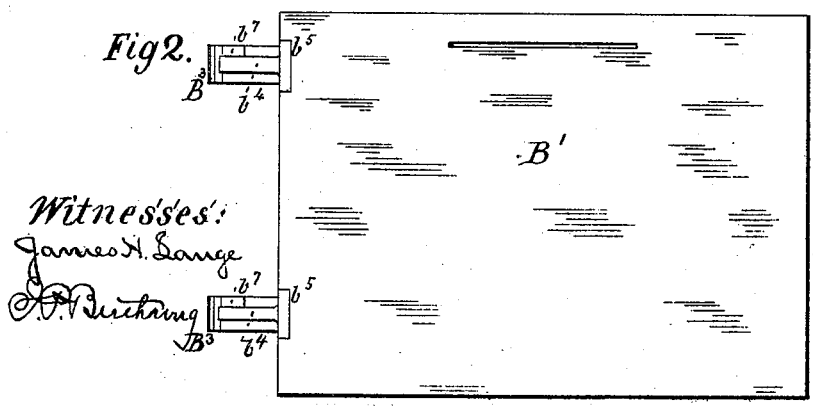
Figure 8:
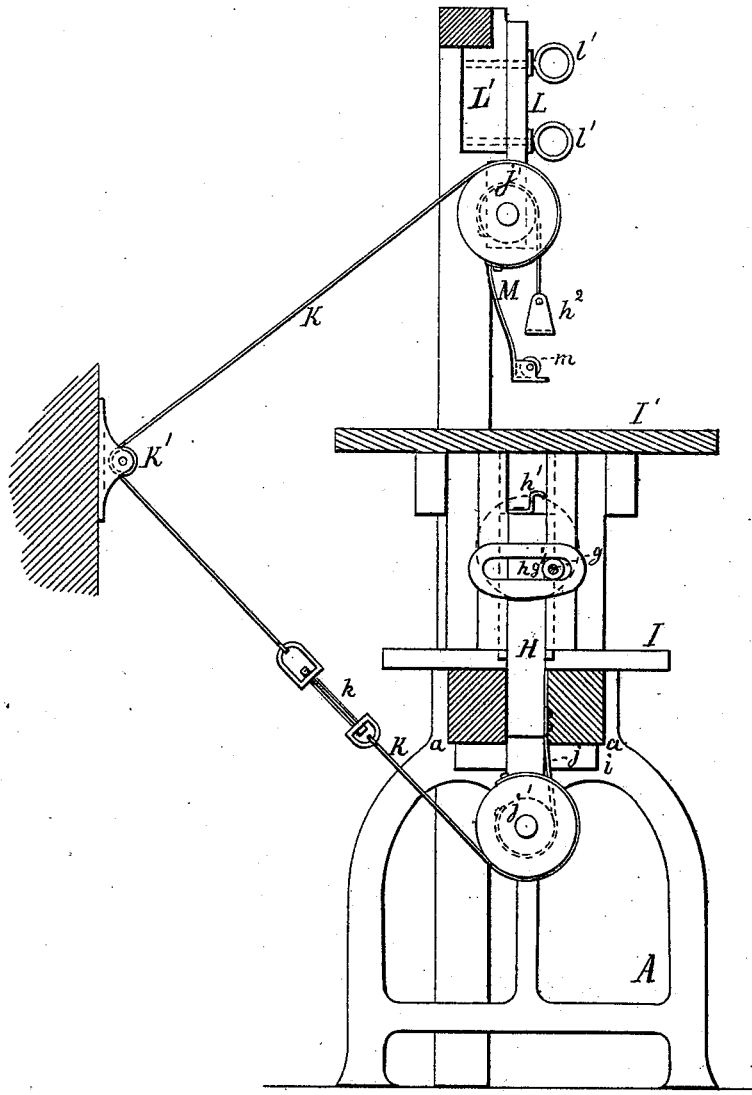
Figure 9:
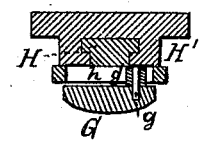
Figure 10:
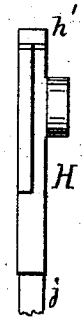

Figure 1 is an elevation of my combined foot-power sawing-tool. Fig. 2 is a top view of its circular saw table. Fig. 3 is an elevation of one of its hinges. Fig. 4 is a top view of the same. Fig. 5 is an end view of the fret-saw proper and its connection with the main shaft, omitting the other parts of the combination-tool. Fig. 6 is a front view of the fulcrum-frame of the fret-saw. Fig. 7 is a detail view of its tension device. Fig. 8 is a detail view of the jig-saw of my combination-tool. Fig. 9 is a horizontal section through its operating crank-pin and slide. Fig. 10 is a side view of the said slide. Fig. 11 is a plan view of the treadle of my combination-tool. Fig. 12 is an end view of the treadle-motion proper of my combination-tool, omitting the saws. Fig. 13 is a central longitudinal section through the operating-pulley of the treadle-motion. Fig. 14 is an enlarged detail view of the connection between the operating-pulley and the fly-wheel of the main shaft.

The nature of my invention consists in a novel tension device for the jig-saw, and an improved construction of a removable table for the jig-saw.

In the drawings, A represents a lathe-body of ordinary construction. Upon its shears $a$ a frame, B, of a circular saw, $c$, is fastened by means of screw-bolts $b$, dog-plates $b^1$, and thumb-nuts $b^2$. A table, $B^1$, rests upon the frame B, and is connected with it by means of hinges $B^2$ $B^3$. The upper hinge, $B^2$, is screwed to the table $B^1$, and consists of a horizontal cylinder, $b^3$, a narrow neck, $b^4$, and a transverse foot-plate, $b^5$, wherewith it is fastened. The lower hinge, $B^3$, is annular, and encircles the part $b^3$ of the upper hinge, $B^2$, the neck $b^4$ of which fits into a central slot, $b^6$, of the lower hinge, the lower part of which slot is entirely open on one side, and forms a passage, $b^7$, just large enough to allow the neck $b^4$ to be slipped in or out. If, therefore, the table $B^1$ is turned over and then pushed sidewise, it becomes detached from the frame B, and by horizontally inserting the part $b^3$ and neck $b^4$ the table $B^1$ is reattached to the frame B.

In the frame B the saw-shaft C is properly hung, having a circular saw, $c$, at one end, and a fly-wheel, $C^1$, at the other. The fly-wheel $C^1$ is provided with an eccentric, $C^2$, which has at its free side two guide-lugs, $c^1 c^2$, whereby the eccentric-strap $d$ is kept in place, as shown in Figs. 1 and 5. An eccentric-rod, D, fits about one-third of the circumference of the eccentric, and is, at its foot, provided with a strap, $d$, fastened thereto by a thumb-screw, $d^1$. The strap $d$ fits about one-third around the eccentric, and can easily be detached from it by loosening the thumb-screw $d^1$ and swinging the strap off while shaft C is in such position that the lugs $c^1 c^2$ are not in the way. The rod D is pivoted at $d^2$ to the lower lever, E, of a fret-saw. The short arm of the lever E is connected with the short arm of an upper lever, E', by means of a tension device consisting of two stirrups, $e$ $e^1$, and a swivel-screw, $e^2$, whereby the two stirrups may be screwed toward or from each other. The levers E E' are provided with fulcrum-shafts $e^3$ $e^4$, which are stepped at one side, and provided with pins $e^5$ on the other side, and which are hung in a frame, F F$^1$. The part F of the frame is a rod, of suitable shape and length, so that its lower end may be fastened to the foot of the lathe A, as at $a^1$. To the upper part of the rod F the part F$^2$ is fastened, so that they form an oblong sufficiently large for the admittance of the levers E E', which can easily be removed therefrom by first removing the pins $e^5$, and then slipping the shafts $e^3$ $e^4$ back until their stepped ends have left the rod F, whereupon they are entirely removed from the part F$^1$ and the levers are disengaged. A flange, $f$, of the part F$^1$ serves as means for fastening the fulcrum-frame to the saw-frame B.

The right end of the saw-shaft C is sufficiently extended beyond the saw $c$ to carry a crank-plate, G, with a crank-pin, $g$, and a friction-roller, $g'$, upon it. The roller $g'$ moves in a horizontal slot, $h$, of a vertical slide, H, dovetailed into a vertical guide, H', which forms a part of the frame I of a jig-saw table, I¹. The center part, I², of the frame I is fitted between the shears $a$ of the lathe-body A, and extends below the same, where it is provided with a double pulley, J, just below the slide H. The frame I is fastened to the shears $a$ by means of a dog-plate, $i$, and bolt $i^1$, with thumb-screw $i^2$, and thus it may be fastened in position for operation with the jig-saw or out of the way when the circular saw is to be used.

The top part of the slide H is provided with a slotted metal head, $h^1$, to which the lower end of the saw-blade is secured. To the lower part of the slide H a strap, $j$, is attached, which is fastened to the smaller pulley $j^1$ of the double pulley J. To the larger pulley $j^2$ of the said double pulley a tension-strap, K, is attached, which passes over a tension-pulley, K', suitably attached to one of the walls of the shop, and finally is fastened to the larger pulley $j^3$ of another double pulley, J'. The pulley J' is attached to a slide-head, L, suitably attached to a pendent beam, L', of the shop by means of slots $l$ and set-screws $l'$, so as to be vertically adjustable.

An ordinary vertically-adjustable presser-foot, M, is fastened to the back of the pendant L, and is, near its foot, provided with a centrally-grooved guide-roller, $m$, for the guidance of the saw.

To the small pulley $j^4$ of the double pulley J' a strap, $j^5$, is attached, which, at its lower end, is provided with a slotted head, $h^2$, to which the upper end of the saw-blade is secured. An expansible swivel-connection, $k$, of ordinary construction, or similar to that used in the fret-saw, serves to take up the slack of the strap K.

The described mode of hanging the jig-saw has the advantage that the saw does not yield below the table I¹, and above, where it can be observed, it only yields with the presser-foot, thus doing its work more accurately than other jig-saws of lighter construction. By means of the strap K and double pulleys J J' the tension of the jig-saw may be very great, while that of the strap K is comparatively easy, and thus the wear and tear of the strap are greatly reduced.

The fret-saw is provided with a removable table, N, the legs $n$ of which are provided with steady-pins $n^1$. Two of the legs $n$ rest on the table B¹ of the circular saw, their pins $n^1$ being firmly lodged in the wood of the table. One leg $n$ rests on an upright arm, O, fastened to the end of the lathe-body A. The pin $n^1$ is fitted into the arm O, and held there by a set-screw, $o$. The fourth leg is substituted by a bracket, N', fastened to the lathe-body at $n^2$ and to the table at $n^3$ by screws or other suitable means.

The treadle of the foot-power consists of a foot-board, P, hinged at $p$ to a rigid bar, P¹, and resting upon two levers, P² P³, hinged to the same bar. The hinge $p$ of the foot-board P is slightly yielding, so the foot-board may be swung a little in or out upon the levers for the purpose of adjustment. The levers P² P³ have for this reason holes $p^1$ at suitable distances, into which the fastening screws or bolts $p^2$ of the foot-board are inserted.

A spring, Q, connects with the central part of the treadle and the lathe-body above, and thereby keeps the treadle up. A number of staples, $q$, are fastened to the lever P², and to these the treadle-strap $q^1$ is hooked, according to the convenience of the operator.

A double pulley, R, with a shaft, $r$, is hung between the end of the shaft C and the arm O, and has the strap $q^1$ attached to it. The strap $q^2$ of a take-up spring, Q', is also attached to the said pulley. The large end of the pulley R is provided with a face-plate, R', two pawls, $r^1$, and a double rear abutment, $r^2$, for the pawls. The fly-wheel C¹ is provided with a circular rim, $c^3$, having inner ratchet-teeth, $c^4$. The formation of the abutment $r^2$ is such that the square ends of the pawls $r^1$ rest firmly upon them when the pawls are engaged with the ratchet-teeth $c^4$, as seen in Fig. 14. By this construction the strain of the engaged pawl is sustained by its abutment, leaving the pivot of the pawl free from excessive wear.

The shaft $r$ has its one bearing in the end of the shaft C, which avoids the construction of an extra journal-bearing.

Operation: When the treadle is moved down the strap $q^1$ revolves, and one of the pawls engages with one of the ratchet-teeth $c^4$, and thereby revolves the fly-wheel C¹ and shaft C, with the circular saw $c$, which is ready for use by having its table B¹ in position. When the treadle is relieved the spring Q moves it up again, and the take-up spring Q' reverses the motion of the pulley R until the strap $q^1$ is taut. When the fret-saw is to be used the eccentric-rod D is moved upon the eccentric C². The rod $d$ is turned upon the eccentric and fastened to the rod D by means of the thumb-screw $d^1$. When the jig-saw is to be used the table I is removed from its position at the end of the lathe-body by loosening the thumb-screw $i^2$ and slipping the frame I under the head $h^2$, and there fastened. The saw is then secured to the heads $h^1$ $h^2$.

Having thus described my invention, what I claim, and wish to secure by Letters Patent, is—

1. The combination of the pulleys J J', the tension-belt K, the saw-straps $j$ $j^4$, and the slide H, substantially as set forth.

2. The combination of the lathe-bed A with the table I I¹, having the vertical guide H', and the extension I², to receive the double pulley J, substantially as and for the purpose set forth.

In testimony that I claim the foregoing as my own I hereunto affix my signature in the presence of two witnesses.

NELS PETER SELDEN.

Witnesses:
 D. H. FROST,
 S. S. SWEET.